June 2, 1931.  J. KUBLER ET AL  1,808,559
ELECTRICAL SYSTEM FOR VOLTAGE REGULATION
Filed Feb. 16, 1929
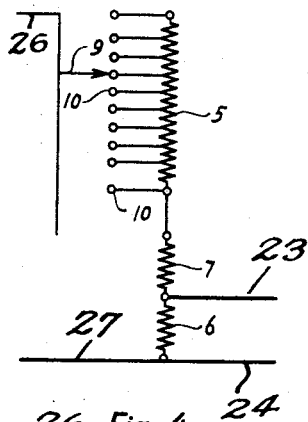
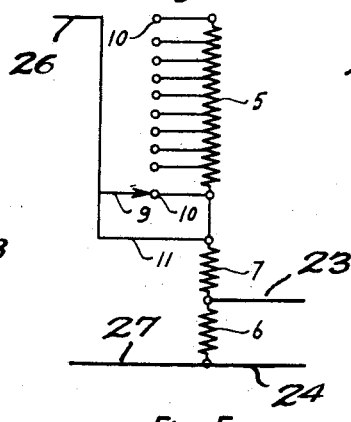
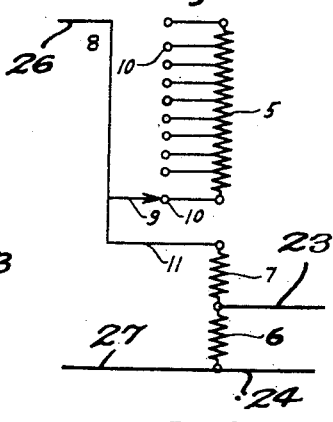
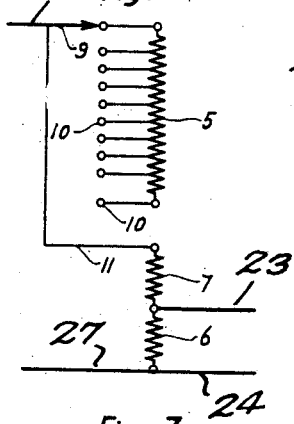
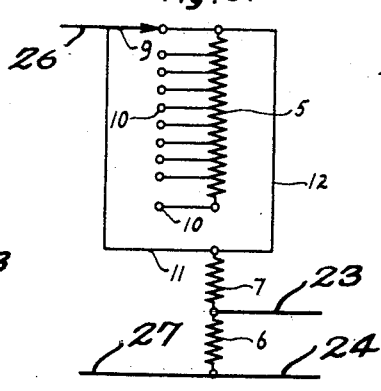
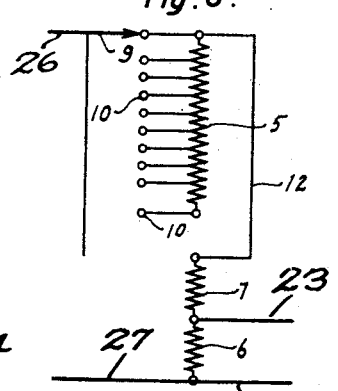
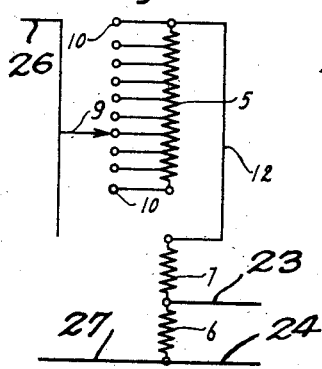
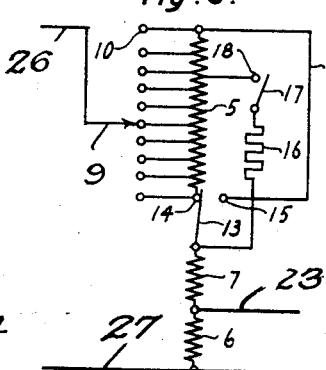
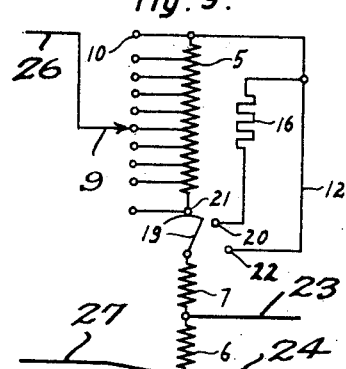
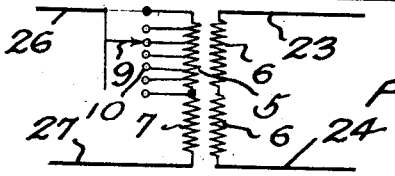
Inventors
Johannes Kubler
Arnold Haller
By *Alfred H. Dyson*
Attorney Patented June 2, 1931

1,808,559

UNITED STATES PATENT OFFICE

JOHANNES KUBLER AND ARNOLD HALLER, OF BADEN, SWITZERLAND

ELECTRICAL SYSTEM FOR VOLTAGE REGULATION

Application filed February 16, 1929, Serial No. 340,442, and in Germany January 27, 1928.

This invention relates to improvements in operating methods for electrical equipment and, more particularly, to improvements in operating methods for increasing or decreasing the voltage in variable transformers.

Transformers for regulating voltage, in which the regulating winding may be switched into or out of the circuit, have been so constructed, heretofore, that it was necessary to disconnect the regulating winding entirely from the circuit when the transfer from high voltage to low voltage, or vice versa, was made. Such operation causes a condensing action between the regulating or variable winding and the excitation winding, generally arranged concentric therewith, which causes cracking noises and may result in flash-overs or discharges capable of severely damaging the transformer.

It is, therefore, among the objects of the present invention to provide a method for changing the connections of a regulating transformer in such sequence that condensing action in the transformer is prevented.

Another object of the invention is to provide a method for sequentially changing the connections of a regulating transformer in such manner that the variable winding of the transformer need not be entirely disconnected from the circuit when changing from voltage "boosting" or increasing to voltage "bucking" or decreasing position.

Objects and advantages, other than those above set forth, will be apparent from the following description and the accompanying drawings which illustrate the connections of a transformer in different embodiments of the invention.

In the drawings:—

Figures 1 to 7, inclusive, illustrate different connections of one embodiment of the invention diagrammatically shown, Figs. 8 and 9 diagrammatically illustrate a modified form of the invention, employing a resistance included in the transformer structure, and Fig. 10 diagrammatically illustrates one embodiment of the invention applied to the usual multi-winding transformer rather than to an auto-transformer as illustrated in the preceding figures.

Referring more particularly to the drawings by characters of reference, numeral 5 indicates a variable portion of a regulating winding and numeral 7 indicates a non-variable portion of the regulating winding. The non-variable and variable portions of the regulating winding are connected and are arranged in inductive relation with an excitation winding 6. The variable portion 5 is provided with a plurality of taps 10, spaced at intervals along the entire length thereof, which are so arranged that sequential contact therewith may be made by a switch 9 which is connected to the line 26 of the transformer. The transformer may be connected to circuit leads 23, 24 with winding 6 across the leads and windings 5 and 7 in series across the circuit leads 26 and 27, as shown, for example, in Fig. 1. The excitation winding 6 may be either the primary or the secondary winding of the transformer, shown in Figs. 1 to 9, inclusive, as an auto-transformer. The two circuits 23, 24 and 26, 27 may be either supply circuits for the transformer or may be load circuits from the transformer as may be necessary to secure the desired results. For the purposes of clearness, however, the circuit 26, 27 will be considered as the supply circuit and circuit 23, 24 will be considered as the load circuit. It will be understood that the primary winding 5, 7 and the secondary winding 6 are arranged in loosely-coupled inductive relation.

Connection of the several windings of the auto-transformer, as shown in Fig. 1, places the transformer in condition for boosting or increasing the voltage of the variable winding 5, it being assumed that the regulating winding, when connected as in Fig. 1, is in voltage-aiding relation with respect to the excitation winding. When it is desired to change the action of the winding 5 from boosting or increasing to bucking or decreasing voltage with respect to excitation winding 6, connections are made as shown in Fig. 2 as the first of a series of transposition steps or stages by moving switch 9 to the last of the taps 10 and connecting one terminal of the coils 6 and 7 directly to the line 26 of the transformer by means of a connection 11.

The second step in transposition from boosting to bucking voltage position is shown in Fig. 3 in which the direct connection between coils 6 and 7 and coil 5 is removed. The switch 9 is now moved from last tap 10, as shown in Fig. 3, to the first tap, as shown in Fig. 4. A connection 12 is made from one terminal of coils 6 and 7 to one terminal of coil 5, as shown in Fig. 5, and connection 11 to the line 26 of the transformer is removed so that the connections are as shown in Fig. 6. It will be seen that variable regulating winding 5 is now connected to coil 7 in reverse order as compared with its connection to said coil 7 in Fig. 1. Since in the Fig. 1 form of connection it is assumed that coil 5 is in voltage-aiding relation with respect to excitation coil 6, it is evident that coil 5, as connected to Fig. 6, if now put in circuit, will be in voltage-opposing or buckling relation with respect to coil 6. Switch 9 may now be moved to contact with any one of the taps 10 of the coil 5 to provide the desired value for decreasing the voltage. It will be apparent that current will flow through coils 6 and 7, connection 12, coil 5 to switch 9 and to line 26, and that the voltage will be decreased in proportion to amount of coil 5 in circuit.

In Figs. 2, 3, 4, 5 and 6, it is to be noted that variable regulating coil 5 is out of circuit while the process continues of changing its connections to the excitation winding from boosting to bucking position. Said coil 5 is, however, never entirely disconnected from the circuit during the change-over process and, therefore, undesirable condenser action between the windings is avoided.

It will be apparent that changing back from the bucking position of connections shown in Fig. 7 to the boosting position shown in Fig. 1 requires connections in reverse order in the transposition stages from those just described.

Fig. 8 illustrates an embodiment of the invention employing a resistance, thereby decreasing the number of transposition steps or stages required to change the connections from one position to the other. Coils 6 and 7 are provided with a switch 13 by which connection may be made through contact 14 directly to coil 5 or to the opposite terminal of coil 5 by way of contact 15 and connection 12. A resistance 16 is connected to one terminal of the coils 6 and 7 and is provided with a switch 17 which is arranged to contact with a tap 18 taken from the winding 5. When it is desired to change the connections from the boosting condition shown in the figure to a bucking position, switch 17 is closed on contact 18 and switch 13 is closed on contact 15. Switch 17 is then again opened and switch 9 is moved to the tap required to produce the proper voltage value.

The embodiment shown in Fig. 9 is similar to that shown in Fig. 8, with the exception that switches 13 and 17 are replaced by a single switch 19 which is adapted to make contact at 20 before it breaks contact at 21 and make contact at 22 before breaking contact at 20. The resistance 16 is directly connected with one terminal of the coil 5 instead of being connected by way of a tap taken from coil 5 such as is shown in Fig. 8. To change the connections from the boosting position shown to the bucking position, switch 19 is moved to bridge contacts 20 and 21 and is then moved to contact only with 20 thereby connecting coil 5 with coils 6 and 7 through resistance 16. Switch 19 may be then moved to bridge contacts 20 and 22 or may be moved into contact only at 22 whereupon the transformer connections are in position for bucking or decreasing the voltage. Switch 9 is then moved to the tap required to produce the desired decrease in voltage.

Fig. 10 illustrates the invention applied to a multi-winding transformer in which 5 is a variable portion of the primary winding and 7 is an unvariable portion of the primary winding connected in series with the winding portion 5 across the supply circuit 26, 27. The transformer secondary winding is divided into two portions 6, 6 connected in series across the load circuit 23, 24.

Although only several embodiments of the invention have been illustrated and described, it will be understood that various other embodiments are possible, and that various changes may be made without departing from the spirit of the invention or the scope of the claims.

The invention claimed is:

1. In an electrical system of the character described, electrical-supply leads, leads for connection to a load, transformer apparatus comprising primary windings normally connected in series relation with respect to each other across said supply leads and a secondary winding connected permanently across said load leads independently of said primary windings, one of said primary windings being variable, and connections for connection and disconnection in a predetermined sequence in said system to reverse the connection of the variable primary winding in said system while maintaining an electrical circuit between said supply leads through one of said primary windings.

2. In an electrical system of the character described, electrical-supply leads, leads for connection to a load, transformer apparatus comprising primary windings normally connected in series relation with respect to each other across said supply leads and a secondary winding connected permanently across said load leads independently of said primary windings, one of said primary windings being variable, and connections for connection and disconnection in a predetermined sequence in said system to reverse the connection of the variable primary winding in said system while maintaining an electrical circuit between said supply leads through one of said primary windings, certain of said connections comprising a resistance disposed in said system for inclusion in said electrical circuit.

3. In an electrical system of the character described, electrical-supply leads, leads for connection to a load, transformer apparatus comprising primary windings normally connected in series relation with respect to each other across said supply leads and a secondary winding connected permanently across said load leads independently of said primary windings, one of said primary windings being variable, connections for connection and disconnection in a predetermied sequence in said system to reverse the connection of the variable primary winding in said system while maintaining an electrical circuit between said supply leads through one of said primary windings, certain of said connections comprising a resistance disposed in said system for inclusion in said electrical circuit, and a single switch common to said connections for effecting said predetermined sequence of connection and disconnection thereof.

In testimony whereof we have hereunto subscribed our names this 8th day of January A. D. 1929.

JOHANNES KUBLER.
ARNOLD HALLER.